United States Patent
Ruan et al.

(10) Patent No.: US 9,716,597 B2
(45) Date of Patent: Jul. 25, 2017

(54) AUTOMATIC INTERLOCKING LOGIC DETECTION METHOD BASED ON GOOSE COMMUNICATION MECHANISM

(71) Applicants: State Grid Corporation of China (SGCC), Beijing (CN); Electric Power Research Institute of State Grid Zhejiang Electric Power Company, Hangzhou, Zhejiang (CN)

(72) Inventors: Lixiang Ruan, Zhejiang (CN); Chengyu Lu, Zhejiang (CN); Dongqi Wu, Zhejiang (CN); Song Wang, Zhejiang (CN); Feng Ding, Zhejiang (CN); Kai Tong, Zhejiang (CN); Jiazhuo Xuan, Zhejiang (CN)

(73) Assignees: State Grid Corporation of China (SGCC), Beijing (CN); Electric Power Research Institute of State Grid Zhejiang Electric Power Company, Zhejiang (CN)

(*) Notice: Subject to any disclaimer, the term of this patent is extended or adjusted under 35 U.S.C. 154(b) by 0 days.

(21) Appl. No.: 14/899,511

(22) PCT Filed: Dec. 24, 2014

(86) PCT No.: PCT/CN2014/094778
§ 371 (c)(1),
(2) Date: Dec. 17, 2015

(87) PCT Pub. No.: WO2015/154527
PCT Pub. Date: Oct. 15, 2015

(65) Prior Publication Data
US 2016/0156481 A1 Jun. 2, 2016

(30) Foreign Application Priority Data
Apr. 9, 2014 (CN) .......................... 2014 1 0139307

(51) Int. Cl.
*H04L 12/28* (2006.01)
*H04L 12/24* (2006.01)
(Continued)

(52) U.S. Cl.
CPC ......... *H04L 12/2803* (2013.01); *H04B 3/542* (2013.01); *H04B 3/546* (2013.01);
(Continued)

(58) Field of Classification Search
None
See application file for complete search history.

(56) References Cited

U.S. PATENT DOCUMENTS 4,368,509 A * 1/1983 Li ...................... G05B 13/0205
700/29
6,104,986 A * 8/2000 Arevalo ................... H03H 7/20
702/106
(Continued)

FOREIGN PATENT DOCUMENTS

CN 101887269 A 11/2010
CN 102064613 5/2011
(Continued)

OTHER PUBLICATIONS

Examination Report issued by the State Intellectual Property Office of the People's Republic of China, dated Jul. 2, 2015, for Chinese Patent Application No. 201410139307.X; 4 pages (English Summary of Report Attached).
(Continued)

*Primary Examiner* — Jeffrey M Rutkowski
*Assistant Examiner* — Jonathan B Wood
(74) *Attorney, Agent, or Firm* — Faegre Baker Daniels LLP

(57) ABSTRACT

A method for quickly carrying out effective automatic interlocking logic detection based on a GOOSE communi-
(Continued)

cation mechanism, comprising: introducing an automatic system device model and configuration satisfying the IEC61850 standard, and simulating a GOOSE communication behavior in which an intelligent electronic device acts as a quick packet transmitter and receiver, so as to realize the closed-loop detection function by independent publishing and feedback monitoring GOOSE information.

1 Claim, 2 Drawing Sheets

(51) Int. Cl.
H04B 3/54 (2006.01)
H04L 12/413 (2006.01)
(52) U.S. Cl.
CPC ........ *H04L 12/413* (2013.01); *H04L 41/0853* (2013.01); *H04L 41/0893* (2013.01); *H04L 41/145* (2013.01); *H04B 2203/5466* (2013.01)

(56) References Cited

U.S. PATENT DOCUMENTS

| | | | | |
|---|---|---|---|---|
| 7,672,816 | B1* | 3/2010 | Kulkarni | B21D 26/027 700/145 |
| 2006/0173874 | A1* | 8/2006 | Chen | G06F 17/11 |
| 2008/0137792 | A1* | 6/2008 | Kropaczek | G21C 3/328 376/245 |
| 2009/0128100 | A1 | 5/2009 | Yasuda et al. | |
| 2010/0131259 | A1* | 5/2010 | Joshi | G11C 11/412 703/14 |
| 2011/0130135 | A1* | 6/2011 | Trigui | H04W 24/08 455/423 |
| 2012/0123764 | A1* | 5/2012 | Ito | G06F 11/3664 703/21 |
| 2012/0197686 | A1* | 8/2012 | Abu El Ata | G06Q 10/06393 705/7.39 |
| 2012/0265360 | A1* | 10/2012 | Smit | G05F 1/66 700/293 |
| 2013/0111388 | A1* | 5/2013 | Togami | G06F 19/3437 715/771 |
| 2014/0278313 | A1* | 9/2014 | Kolbet | G06F 17/5095 703/8 |
| 2015/0318739 | A1* | 11/2015 | Oda | H02H 7/26 700/292 |
| 2016/0292248 | A1* | 10/2016 | Garcia | G06Q 10/063 |

FOREIGN PATENT DOCUMENTS

| | | |
|---|---|---|
| CN | 102157983 | 8/2011 |
| CN | 103022993 | 4/2013 |
| CN | 202856464 U | 4/2013 |
| CN | 103297358 A | 11/2013 |
| CN | 103928985 A | 7/2014 |
| JP | 2002315175 | 10/2002 |

OTHER PUBLICATIONS

International Preliminary Report on Patentability, PCT/CN2014/094778, Applicant-State Grid Corporation of China (SGCC), The International Bureau of WIPO, issued Oct. 12, 2016, 7 pages.

International Search Report and Written Opinion (in Chinese language) issued by The State Intellectual Property Office of the People's Republic of China, dated Mar. 6, 2015, for International Application No. PCT/CN2014/094778; 12 pages.

English translation of the International Search Report issued by The State Intellectual Property Office of the People's Republic of China, dated Mar. 6, 2015, for International Application No. PCT/CN2014/094778; 3 pages.

English translation of the Written Opinion of the International Searching Authority, dated as of the International Search Report, Mar. 6, 2015, for International Application No. PCT/CN2014/094778; 4 pages.

* cited by examiner

AUTOMATIC INTERLOCKING LOGIC DETECTION METHOD BASED ON GOOSE COMMUNICATION MECHANISM

CROSS-REFERENCE TO RELATED APPLICATIONS

This application is the national phase of International Application No. PCT/CN2014/094778, filed Dec. 24, 2014, entitled "AUTOMATIC INTERLOCKING LOGIC DETECTION METHOD BASED ON GOOSE COMMUNICATION MECHANISM", which claims priority to Chinese Patent Application No. 201410139307.X, entitled "AUTOMATIC INTERLOCKING LOGIC DETECTION METHOD BASED ON GOOSE COMMUNICATION MECHANISM" filed on Apr. 9, 2014 with the State Intellectual Property Office of China, both of which are expressly incorporated herein reference in their entireties.

FIELD

The present disclosure relates to the field of a Generic Object Oriented Substation Event (GOOSE) of the international standard "substation communication network and system" applied in a substation automation system, and in particular to an automatic interlocking logic detection method based on a GOOSE communication scheme.

BACKGROUND

IEC61850 standard is a series of latest "substation communication network and system" standards created by International Electrotechnical Commission's Technical Committee 57 (TC57) for interoperation of substation automation systems. The standard is supported by most mainstream vendors in the world and becomes the only global uniform standard in substation automation.

Generic Object Oriented Substation Event GOOSE is a fast packet scheme for fast communication of substations and proposed based on the IEC61850 standard. The GOOSE packet is mapped directly to a link layer and a physical layer after passing through a presentation layer, and a switched Ethernet with a priority and a virtual local area network VLAN tag (IEEE 802.1Q) is adopted to ensure reliable and real-time packet transmission. The IEC61850 standard stipulates that: an SCL file is a substation configuration description language for communication of substation automation systems. The SCL file includes GOOSE communication parameters and engineering instance data structures, and the W3C standard XML is taken as a metalanguage of the SCL file. Hence, a feature of practical engineering GOOSE communication is achieving full expression of text configuration by XML language.

With regional construction of an intelligent grid and spread application of new technology of intelligent substations, the IEC61850 standard is widely applied to substation automation systems of the intelligent gird. State sharing between primary equipments in the process layer network is achieved by GOOSE communication. Devices in the bay level make interlocking logic determinations based on GOOSE information, and transfer the logic determination results to devices in the process layer by using GOOSE communication. A technical solution for performing fast and effective automatic interlocking logic detection based on the uniform GOOSE communication transmission protocol of the process layer network is highly required.

SUMMARY

A fast and effective automatic interlocking logic detection method based on a GOOSE communication scheme is provided to address the above conventional technical problem. In the method, automation system device models and configuration conforming to the IEC61850 standard are imported, GOOSE communication behaviors of the intelligent electronic device as a fast packet publisher or receiver are simulated, and closed-loop detection is achieved through independent publishing and feedback monitoring GOOSE information.

In view of this, technical solutions as follows are employed in the present disclosure. An automatic interlocking logic detection method based on a GOOSE communication scheme includes:

1) importing an input source of a substation configuration document SCD file, and obtaining a list and configuration information of all intelligent electronic devices IED within a substation through parsing the SCD file;

2) selecting an IED to be detected, and obtaining GOOSE binary input signals and GOOSE binary output signals of the IED through analyzing a logic association configuration of the IED;

3) selecting a group of detection scripts, reading variables defined in the group of scripts, and setting association between the variables and the GOOSE binary input signals and the GOOSE binary output signals;

4) starting automatic interlocking logic detection;

5) selecting automatically a script for detection from the group of scripts and starting automatic detection of the script;

6) performing simulation based on initial values of all the variables in the script and sending a corresponding GOOSE packet;

7) waiting for a period of time, and obtaining a locking output result of the IED to be detected;

8) determining whether the locking output result is correct; in the case that the locking output result is correct, printing information indicating the result is correct and proceeding to step 9); in the case that the locking output result is not correct, printing information indicating the result is incorrect and selecting whether to continue to perform subsequent detection of the script; and proceeding to step 9) in the case that continuing the detection is selected, or proceeding to step 14) in the case that ending the detection is selected;

9) inverting an initial value of a variable in the script, performing simulation and sending a corresponding GOOSE packet;

10) waiting for a period of time, and obtaining a locking output result of the IED to be detected;

11) determining whether the locking output result obtained in step 10) is correct; in the case that the locking output result is correct, printing information indicating the result is correct and proceeding to step 12); in the case that the locking output result is not correct, printing information indicating the result is incorrect and proceeding to step 12);

12) restoring the variable in the script to the initial value, performing simulation and sending a corresponding GOOSE packet;

13) determining whether initial values of all the variables in the script have ever been changed; proceeding to step 14) in the case that the initial values of all the variables in the script have ever been changed, or proceeding to step 9) in the case that the initial value of any variable in the script has not ever been changed;

14) determining whether all the scripts in the group of scripts are detected; proceeding to step 15) in the case that all the scripts are detected, or proceeding to step 5) in the case that any script is not detected; and 15) printing all the detection results of the group of scripts, and ending the automatic detection.

In the present disclosure, an SCL file is used to automatically generate GOOSE simulation parameters of corresponding process layer devices; and by using an automatic detection script, a GOOSE sending behavior is controlled and an interlocking logic action of the bay level device is detected and recorded.

In the present disclosure, with the GOOSE communication simulation scheme, the automatic interlocking logic detection of a substation automation system is implemented, a straightforward and reliable technical method is provided for an integration testing of an intelligent grid automation system, a novel and useful method is provided for constructing intelligent substations, and the application of the IEC61850 standard in a power system is greatly promoted.

The automatic interlocking logic detection method according to the present disclosure has been performed on a practical substation automation system, and effectiveness and reliability of the detection method are verified in engineering tests. Therefore, there are both theoretical and practical bases for applying the substation automation system technology.

BRIEF DESCRIPTION OF THE DRAWINGS

To illustrate technical solutions according to embodiments of the present disclosure or in the conventional technology more clearly, drawings for the description of the embodiments or the conventional technology are described briefly hereinafter. Apparently, the drawings described hereinafter are merely a few embodiments of the present disclosure, and other drawings may be obtained by those skilled in the art based on these drawings without any creative work.

DETAILED DESCRIPTION OF THE EMBODIMENTS

For a better understanding of solutions of embodiments of the present disclosure by those skilled in the art, the embodiments of the present disclosure are illustrated in detail by the drawings in conjunction with implementations.

Figure 1:
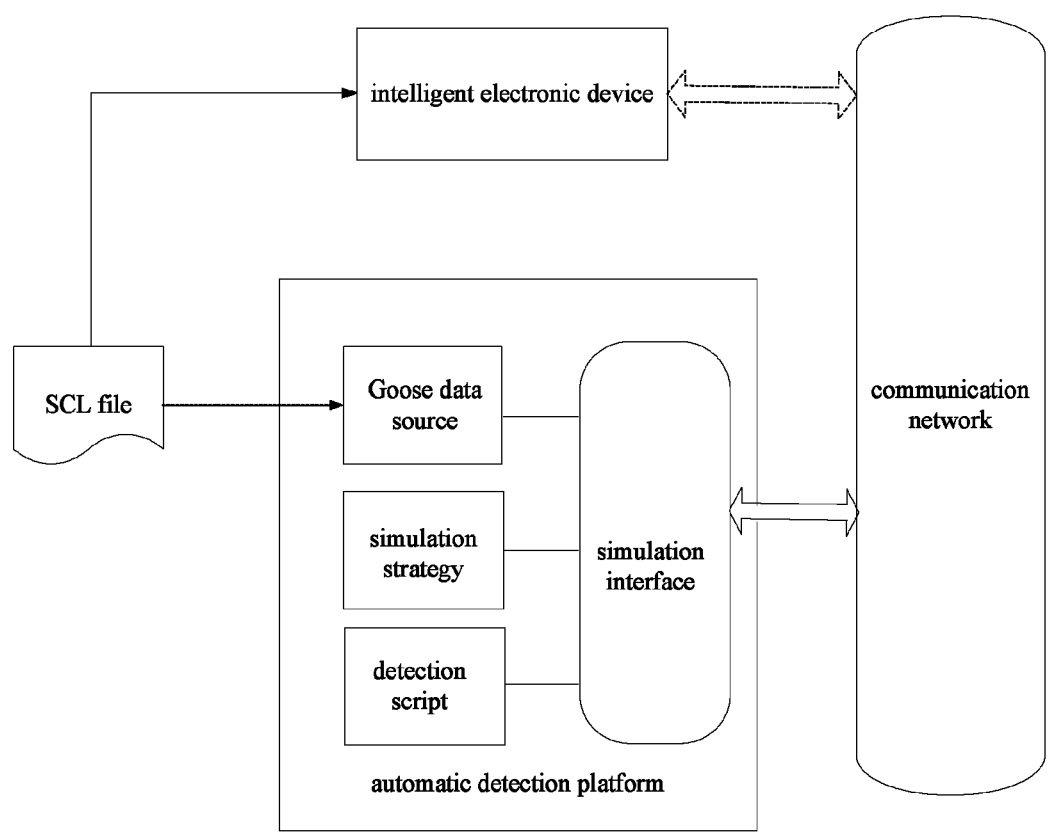
FIG. 1 is a schematic diagram of a principle of automatic interlocking logic detection according to present disclosure.
Figure 2:
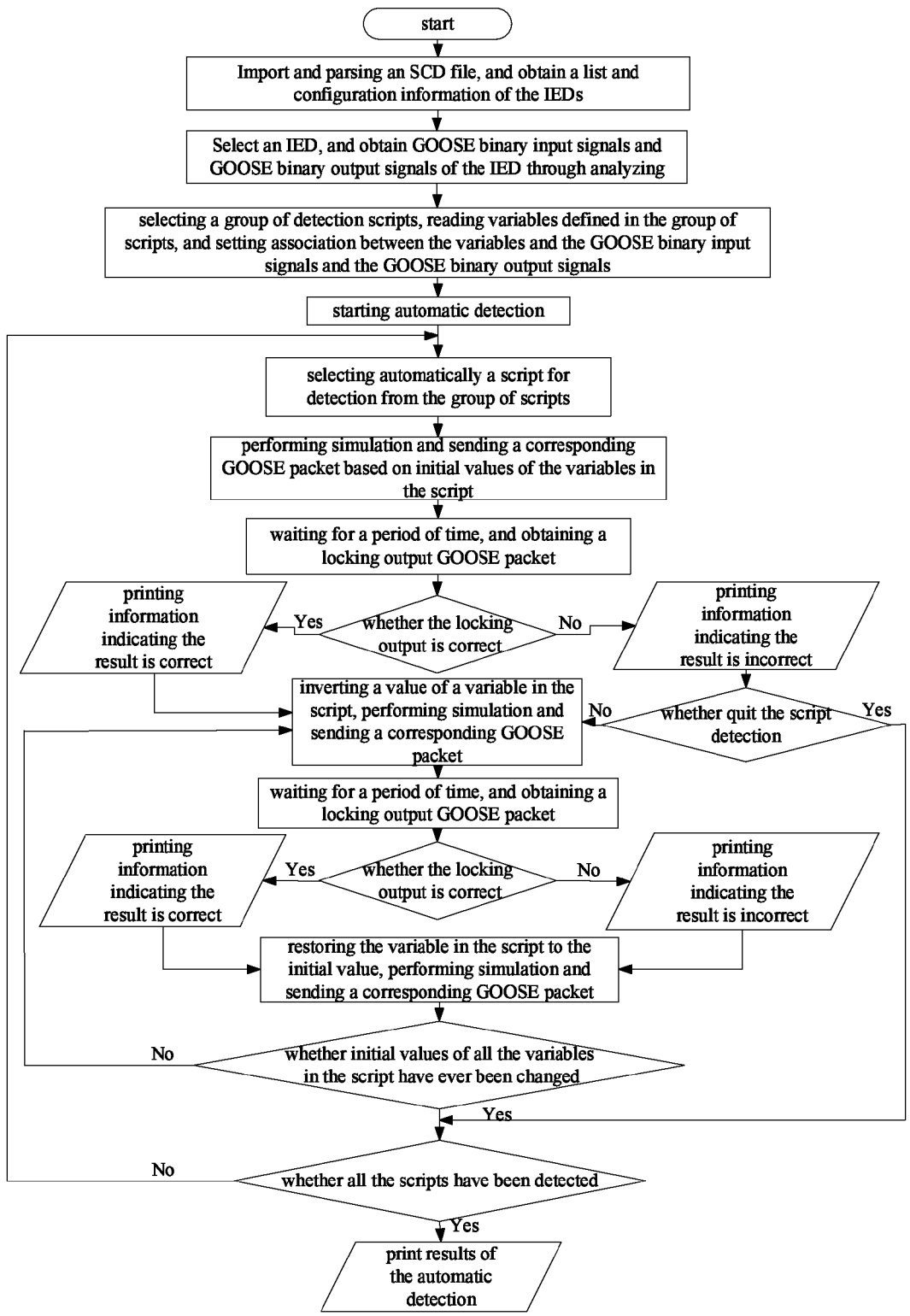
FIG. 2 is a schematic flowchart of automatic interlocking logic detection according to present disclosure.

As shown in FIG. 2, it is provided an automatic interlocking logic detection method based on a GOOSE communication scheme, and the method includes: 1) importing an input source of a substation configuration document SCD file, and obtaining a list and configuration information of all intelligent electronic devices IED within a substation through parsing the SCD file; 2) selecting an IED to be detected, and obtaining GOOSE binary input signals and GOOSE binary output signals of the IED through analyzing a logic association configuration of the IED; 3) selecting a group of detection scripts, reading variables defined in the group of scripts, and setting association between the variables and the GOOSE binary input signals and the GOOSE binary output signals; 4) starting automatic interlocking logic detection; 5) selecting automatically a script for detection from the group of scripts and starting automatic detection of the script; 6) performing simulation based on initial values of all the variables in the script and sending a corresponding GOOSE packet; 7) waiting for a period of time, and obtaining a locking output result of the IED to be detected; 8) determining whether the locking output result is correct; in the case that the locking output result is correct, printing information indicating the result is correct and proceeding to step 9); in the case that the locking output result is not correct, printing information indicating the result is incorrect and selecting whether to continue to perform subsequent detection of the script; and proceeding to step 9) in the case that continuing the detection is selected, or proceeding to step 14) in the case that ending the detection is selected; 9) inverting an initial value of a variable in the script, performing simulation and sending a corresponding GOOSE packet; 10) waiting for a period of time, and obtaining a locking output result of the IED to be detected; 11) determining whether the locking output result obtained in step 10) is correct; in the case that the locking output result is correct, printing information indicating the result is correct and proceeding to step 12); in the case that the locking output result is not correct, printing information indicating the result is incorrect and proceeding to step 12); 12) restoring the variable in the script to the initial value, performing simulation and sending a corresponding GOOSE packet; 13) determining whether initial values of all the variables in the script have ever been changed; proceeding to step 14) in the case that the initial values of all the variables in the script have ever been changed, or proceeding to step 9) in the case that the initial value of any variable in the script has not ever been changed; 14) determining whether all the scripts in the group of scripts are detected; proceeding to step 15) in the case that all the scripts are detected, or proceeding to step 5) in the case that any script is not detected; and 15) printing all the detection results of the group of scripts, and ending the automatic detection.

Example of Application

An implementation of automatic interlocking logic detection according to the present disclosure is illustrated by taking a 220 kV main busbar measure-control device in a digitized substation project as an example.

A GOOSE configuration file related to an SCL model of the measure-control device is as follows. The model file includes three intelligent electronic devices: a 220 kV main busbar measure-control device, a 220 kV main busbar intelligent terminal device and a 220 kV line intelligent terminal device. Through GOOSE communication, the 220 kV main busbar measure-control device receives state information of a disconnect switch and an earthing switch sent from the 220 kV main busbar intelligent terminal device and the 220 kV line intelligent terminal device, and the 220 kV main busbar measure-control device sends a control enable signal for the disconnect switch and the earthing switch to the 220 kV main busbar intelligent terminal device. An interlocking logic relationship of the 220 kV main busbar measure-control device is shown in table 1, where '0' indicates that related devices need to be at a disconnecting position.

TABLE 1 interlocking logic of the 220 kV main busbar measure-control device

| operation device | related device | | | | |
|---|---|---|---|---|---|
| | bus voltage transformer disconnect switch | bus voltage transformer earthing switch | I bus earthing switch 1 | I bus earthing switch 2 | line bay main busbar disconnect switch |
| bus voltage transformer disconnect switch | | 0 | 0 | 0 | |
| bus voltage transformer earthing switch | 0 | | | | |
| I bus earthing switch 1 | 0 | | | | 0 |
| I bus earthing switch 2 | 0 | | | | 0 |

Edition of a Group of Scripts

A group of scripts for automatic interlocking logic detection on the 220 kV bus measure-control device are established, which include four scripts, respectively named: MG, MGD, MGD1 and MGD2. In the group of scripts, variables MG MGD, MGD1, MGD2 and LG1 respectively represent a bus voltage transformer disconnect switch, a bus voltage transformer earthing switch, a bus earthing switch 1, a bus earthing switch 2 and a line bay main busbar disconnect switch. The group of scripts are shown in table 2.

TABLE 2

A group of scripts for interlocking logic of the 220 kV bus measure-control device

| script name | variables related to the scripts | | | | |
|---|---|---|---|---|---|
| | MG | MGD | MGD1 | MGD2 | LG1 |
| MG | | 0 | 0 | 0 | |
| MGD | 0 | | | | |
| MGD1 | 0 | | | | 0 |
| MGD2 | 0 | | | | 0 |

Parsing of an SCL File

A configuration file of an SCL model of "the 220 kV main busbar measure-control device" is read in by a standard XML parser, and following communication parameters and data parameters are obtained by parsing, as shown in table 3 and table 4.

TABLE 3

GOOSE communication parameters

| Communication parameter name | sent by a main busbar measure-control device | received by a main busbar intelligent terminal | received by a line intelligent terminal |
|---|---|---|---|
| multicast address | 01-0C-CD-01-02-27 | 01-0C-CD-01-10-01 | 01-0C-CD-01-12-23 |
| minimum time T1 | 5 ms | 5 ms | 5 ms |
| heart time T0 | 15000 ms | 15000 ms | 15000 ms |
| VLAN number | 3 | 3 | 3 |
| APPID | 0227 | 1001 | 1223 |
| GOCBRef | CM2201GOLD/LLN0.gocb0 | IM2201GOLD/LLN0.gocb0 | IL2201GOLD/LLN0.gocb0 |
| GoID | CM2201GOLD/LLN0.gocb0 | IM2201GOLD/LLN0.gocb0 | IL2201GOLD/LLN0.gocb0 |
| TEST | 0 | 0 | 0 |

TABLE 4

Interlocking logic data parameters

| data parameter | dataset name | data index name | data type |
|---|---|---|---|
| data received | dsGOOSE0 | IM2201 RPIT/QG1XSWI1.Pos.stVal | dual position signal |

TABLE 4-continued

Interlocking logic data parameters

| data parameter | dataset name | data index name | data type |
|---|---|---|---|
| | | IM2201 RPIT/QGD1XSWI1.Pos. stVal | dual position signal |
| | | IM2201 RPIT/MGD1XSWI1.Pos. stVal | dual position signal |
| | | IM5001 RPIT/MGD2XSWI1.Pos. stVal | dual position signal |
| | | IL2201 RPIT/QG1XSWI1.Pos. stVal | dual position signal |
| data sent | dsGOOSE0 | CM2201GOLD/QG1CILO1.EnaOp. stVal | single point signal |
| | | CM2201GOLD/QGD1CILO1.EnaOp. stVal | single point signal |
| | | CM2201GOLD/MGD1CILO1.EnaOp. stVal | single point signal |
| | | CM2201GOLD/MGD2CILO1.EnaOp. stVal | single point signal |

Association Relationship Between Variables of the Group of Scripts

Variables in table 2 "A group of scripts for interlocking logic of the 220 kV bus measure-control device" are associated with the data in table 4 "interlocking logic data parameters", and the association relationship is shown in table 5.

TABLE 5 association relationship between variables and data

| Number | variable name | data name |
|---|---|---|
| 1 | MG | IM2201 RPIT/QG1XSWI1.Pos. stVal |
| 2 | MGD | IM2201 RPIT/QGD1XSWI1.Pos. stVal |
| 3 | MGD1 | IM2201 RPIT/MGD1XSWI1.Pos. stVal |
| 4 | MGD2 | IM5001 RPIT/MGD2XSWI1.Pos. stVal |
| 5 | LG1 | IL2201 RPIT/QG1XSWI1.Pos. stVal |

Automatic Detection Process

An Automatic detection process is started, scripts are selected one by one, states of variables of a script are changed one by one, an interlocking logic output result of the bus measure-control device is detected automatically, and the output result is compared with an expected result and a detection result is printed in a real time manner. When all scripts of the script group are detected automatically, the final automatic detection result of the group of scripts is printed, and the detection process is ended automatically. A detection process is shown in table 6.

TABLE 6 process of automatic interlocking logic detection of the bus measure-control device

| process sequence number | content in the process | belong to script |
|---|---|---|
| 1 | An automatic detection process is started | |
| 2 | An MG detection script is selected | |
| 3 | Initial values are assigned as MGD (01), MGD1 (01) and MGD2 (01), an MG operation enable signal is outputted by the measure-control device, and information that "the detection result is correct" is printed if the detection result meets expectation | MG |
| 4 | Values are assigned as MGD (10), MGD1 (01) and MGD2 (01), an MG operation disable signal is outputted by the measure-control device, and information that "the detection result is correct" is printed the detection result meets expectation | MG |
| 5 | Values are assigned as MGD (01), MGD1 (10) and MGD2 (01), an MG operation disable signal is outputted by the measure-control device, and information that "the detection result is correct" is printed if the detection result meets expectation | MG |
| 6 | Values are assigned as MGD (01), MGD1 (01) and MGD2 (10), an MG operation disable signal is outputted by the measure-control device, and information that "the detection result is correct" is printed if the detection result meets expectation | MG |
| 7 | Respective variables are restored to initial values MGD (01), MGD1 (01) and MGD2 (01), and information that "the MG detection script passes the test" is printed | MG |

TABLE 6-continued process of automatic interlocking logic detection of the bus measure-control device

| process sequence number | content in the process | belong to script |
|---|---|---|
| 8 | An MGD detection script is selected | |
| 9 | Initial value is assigned as MG (01), an MGD operation enable signal is outputted by the measure-control device, and information that "the detection result is correct" is printed if the detection result meets expectation | MGD |
| 10 | A value is assigned as MG (10), a disable signal of MGD operation is outputted by the measure-control device, and information that "the detection result is correct" is printed if the detection result meets expectation | MGD |
| 11 | The respective variable is restored to the initial value MG (01), and information that "the MGD detection script passes the test" is printed | MGD |
| 12 | An MGD1 detection script is selected | |
| 13 | Initial values are assigned as MG (01) and LG1 (01), an MGD1 operation enable signal is outputted by the measure-control device, the detection result meets expectation, and information that "the detection result is correct" is printed. | MGD1 |
| 14 | Values are assigned as MG (10) and LG1 (01), an MGD1 operation disable signal is outputted by the measure-control device, and information that "the detection result is correct" is printed if the detection result meets expectation | MGD1 |
| 15 | Values are assigned as MG (01) and LG1 (10), an MGD1 operation disable signal is outputted by the measure-control device, and information that "the detection result is correct" is printed if the detection result meets expectation | MGD1 |
| 16 | The respective variables are restored to the initial values MGD (01) and LG1 (01), and information that "the MGD1 detection script passes the test" is printed | MGD1 |
| 17 | An MGD2 detection script is selected | |
| 18 | Initial values are assigned as MG (01) and LG1 (01), an MGD2 operation enable signal is outputted by the measure-control device, and information that "the detection result is correct" is printed if the detection result meets expectation | MGD2 |
| 19 | Values are assigned as MG (10) and LG1 (01), an MGD2 operation disable signal is outputted by the measure-control device, and information that "the detection result is correct" is printed if the detection result meets expectation | MGD2 |
| 20 | Values are assigned as MG (01) and LG1 (10), an MGD2 operation disable signal is outputted by the measure-control device, and information that "the detection result is correct" is printed if the detection result meets expectation | MGD2 |
| 21 | The respective variables are restored to the initial values MG (01) and LG1 (10), and information that "the MGD2 detection script passes the test" is printed | MGD2 |
| 22 | Information that "all detection scripts pass the test" is printed | |
| 23 | The automatic detection process is ended | |

According to the embodiments described above, those skilled in the art can clearly know that all or part of the steps of the method in the above embodiments may be implemented by means of software in conjunction with a necessary hardware platform. Based on such understanding, essential parts or parts of technical solutions of the disclosure contributing to the conventional technology may be embodied as a computer software product. The computer software product may be stored in a storage medium for example a ROM/RAM, a magnetic disc or an optical disc, and include instructions for controlling a computer device (which may be a personal computer, a server or a network communication device such as a media gateway) to perform the method described in various embodiments or certain parts of the embodiments.

It should be noted that, various embodiments in the specification are described in a progressive way, for the same or similar parts between various embodiments, one may refer to the description of other embodiments, and each embodiment lays emphasis on differences from other embodiments. Particularly, for embodiments of the device and system, since they are substantially similar to the embodiments of the method, the description is simple; and for the related parts, one may refer to the illustration of the embodiments of the method. The device embodiments of the device and system described above are only exemplary, the units described as separate components may be separate physically or not. The components displayed as units may be physical units or not, that is, the components may be located in the same place or may be distributed on multiple network units. Part or all the modules may be selected based on actual requirements to achieve objects of the technical solutions of the disclosure. Those skilled in the art can understand and implement the present disclosure without any creative work.

Merely a few preferable embodiments of the present disclosure are described above, and they are not intended to limit the scope of protection of the present disclosure. Any changes, equivalent substitutions, improvements made within the spirit and principles of the present disclosure are all contained in the scope of protection of the present disclosure.

The invention claimed is:

1. An automatic detection method based on a GOOSE communication scheme, comprising:

1) importing an input source of a substation configuration document SCD file, and obtaining a list and configuration information of all intelligent electronic devices IED within a substation through parsing the SCD file;

2) selecting an IED to be detected, and obtaining GOOSE binary input signals and GOOSE binary output signals of the IED through analyzing a logic association configuration of the IED;

3) selecting a group of detection scripts, reading a plurality of variables defined in the group of scripts, and setting association between the variables and the GOOSE binary input signals and the GOOSE binary output signals;

4) selecting automatically a detection script from the group of scripts and starting automatic detection of the script;

5) performing simulation based on initial values of all the variables in the script and sending a corresponding GOOSE packet;

6) waiting for a period of time, and obtaining a locking output result of the IED to be detected;

7) determining whether the locking output result is correct; in the case that the locking output result is correct, printing information indicating the result is correct and proceeding to step 8); in the case that the locking output result is not correct, printing information indicating the result is incorrect and selecting whether to continue to perform subsequent detection of the script; and proceeding to step 8) in the case that continuing the detection is selected, or proceeding to step 13) in the case that ending the detection is selected;

8) inverting an initial value of a variable not previously inverted in the script, performing simulation and sending a corresponding GOOSE packet;

9) waiting for a period of time, and obtaining a locking output result of the IED to be detected;

10) determining whether the locking output result obtained in step 9) is correct; in the case that the locking output result is correct, printing information indicating the result is correct and proceeding to step 11); in the case that the locking output result is not correct, printing information indicating the result is incorrect and proceeding to step 11);

11) restoring the variable in the script to the initial value, performing simulation and sending a corresponding GOOSE packet;

12) determining whether initial values of all the variables in the script have ever been changed; proceeding to step 13) in the case that the initial values of all the variables in the script have ever been changed, or proceeding to step 8) in the case that the initial value of any variable in the script has not ever been changed;

13) determining whether all the scripts in the group of scripts are detected; proceeding to step 14) in the case that all the scripts are detected, or proceeding to step 4) in the case that any script is not detected; and 14) printing all the detection results of the group of scripts, and ending the automatic detection.

* * * * *